(12) United States Patent
Wilson et al.

(10) Patent No.: US 8,633,949 B2
(45) Date of Patent: *Jan. 21, 2014

(54) CONTENT BOUNDARY SIGNALING TECHNIQUES

(71) Applicant: QUALCOMM Incorporated, San Diego, CA (US)

(72) Inventors: Diego A. Wilson, San Diego, CA (US); Sean Scott Rogers, San Diego, CA (US); Per O. Nielsen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/844,551

(22) Filed: Mar. 15, 2013

(65) Prior Publication Data

US 2013/0222312 A1 Aug. 29, 2013

Related U.S. Application Data

(63) Continuation of application No. 12/580,956, filed on Oct. 16, 2009.

(51) Int. Cl.
*G09G 5/00* (2006.01)

(52) U.S. Cl.
USPC .......................................... 345/647; 345/684

(58) Field of Classification Search
USPC .................................................. 345/647, 684
See application file for complete search history.

(56) References Cited

U.S. PATENT DOCUMENTS

| | | |
|---|---|---|
| 2002/0167551 A1 | 11/2002 | Steele et al. |
| 2005/0197763 A1 | 9/2005 | Robbins et al. |
| 2007/0132789 A1 | 6/2007 | Ording et al. |
| 2008/0168384 A1 | 7/2008 | Platzer et al. |
| 2009/0070711 A1 | 3/2009 | Kwak et al. |
| 2009/0073194 A1 | 3/2009 | Ording |
| 2011/0090255 A1 | 4/2011 | Wilson et al. |

FOREIGN PATENT DOCUMENTS

JP 2003330586 A 11/2003

OTHER PUBLICATIONS

International Search Report and Written Opinion—PCT/US2010/051280, ISA/EPO—May 24, 2011.
Koike Y et al., "Timeslider: An Interface to Specify Time Point", UIST 97, 10th Annual Symposium on User Interface Software and Technology, Proceedings of the ACM Symposium on User Interface Software and Technology, Banff, Alberta, Canada, Oct. 14-17, 1997, ACM Symposium on User Interface Software and Technolog, Oct. 17, 1997, pp. 43-44, XP009074765, DOI:10.1145/263407.263507, ISBN: 978-0-89791-881-7.

*Primary Examiner* — Ryan R Yang
(74) *Attorney, Agent, or Firm* — James T. Hagler

(57) ABSTRACT

Methods and devices provide a user interface that provides visual cues when a document pan or scroll has reached an end or boundary by distorting the document image in response to further user inputs. The image distortion functionality may include shrinking, stretching, accordion expansion, or bouncing of a document image. The degree of image distortion may be proportional to the distance that a user input would have the document move beyond the encountered boundary. When a boundary of a document image is reached during a rapid pan or scroll, a bouncing image distortion may be applied to the document image to inform the user that the document reached a boundary during the movement.

44 Claims, 6 Drawing Sheets

CONTENT BOUNDARY SIGNALING TECHNIQUES

The present application is a continuation of U.S. patent application Ser. No. 12/580,956, filed Oct. 16, 2009, entitled "Content Boundary Signaling Techniques," which is hereby incorporated by reference in its entirety.

FIELD OF THE INVENTION

1. Field of the Invention

The present invention relates generally to computer user interface systems and more particularly to user systems providing image distortion functionality.

2. Background

Personal computing devices (e.g. cell phones, PDAs, laptops, gaming devices) provide users with increasing functionality and data storage. Personal computing devices serve as personal organizers, storage for documents, photographs, videos, and music, as well as portals to the Internet and electronic mail. In order to fit within the small displays of such devices, large documents (e.g., photographs, music files and contact lists) are typically displayed in a viewer that can present a portion of the document in a size large enough to be read and be controlled by scrolling or panning functions to reveal other portions. In order to view all or parts of a document image or sort through a list of digital files, typical graphical user interfaces permit users to use scroll or panning functions by making unidirectional movements of one finger on a touchscreen display, as implemented on mobile devices such as the Blackberry Storm®. However, because of the small size of the viewer in portable computing devices, the entire contents of document images do not generally fit in the display. Since only a portion of a large document is generally displayed in the viewer of a computing device, users may lose their position and orientation with respect to the entire document. As such, users may be unable to appreciate the boundaries of a document image based on the portion of a document image that is displayed on the viewer.

SUMMARY

The various aspects include methods for implementing a user interface function on a computing device, including detecting an input of a document movement gesture on a user interface device (e.g., a touch event on a touch surface) of the computing device, determining a document image movement of a document displayed on the computing device based on the movement gesture input, determining whether a boundary of the document is reached based on the determined movement of the document image, and distorting an image of the document displayed on the computing device when a boundary of the document image is reached. Distorting the image of the document may involve one of stretching the document image, shrinking the document image, and bouncing the document image. Distorting the image of the document may include distorting the document image along an axis selected from a horizontal axis, a vertical axis, a diagonal axis, and both the horizontal and vertical axes. Distorting the image of the document image may include distorting the document image in an accordion style by inserting space between display image elements without distorting the display image elements. The aspect methods may be implemented on a computing device in which the user interface device is a touch surface, and the document image movement gesture input is a touch event detected on the touch surface. The aspect methods may be implemented on a computing device in which the user interface device is a touch surface, and the document image movement gesture input is a touch event detected on a touchscreen display. Distorting the image of the document image may include distorting the document image based on a distance that the touch event travels after the boundary of the document is reached. In a further aspect, the methods may further include initiating a rapid pan or scroll animation if the user input represents a flick gesture, determining whether an end of the rapid pan or scroll animation has been reached, and animating the distortion of the document image if the boundary of the document image is reached before the end of the rapid pan or scroll animation is reached. Such animating of the distortion of the document image may include animating a bouncing movement of the document image, or animating a bouncing movement and a compression distortion of the document image. In a further aspect, the methods may further include determining a distortion function to be applied to distort the document image, and calculating a distortion factor based on a distance the document image movement gesture input would move the document image touch event travels after the boundary is reached, in which distorting the document image includes applying the determined distortion function to the display image based on the calculated distortion factor. This aspect may further include determining whether a maximum level of display image distortion is reached, and reverting the display image back to its original form if the maximum level of display image distortion is reached.

Another aspect is a computing device that includes a processor, a display coupled to the processor, and a user interface device (e.g., a touch surface, touch screen, computer mouse, trackball, etc.) coupled to the processor, in which the processor is configured with processor-executable instructions to perform operations of the various aspect methods.

Another aspect is a computing device that includes means for accomplishing the functions involved in the operations of the various aspect methods.

Another aspect is a computer readable storage medium having stored thereon computer-executable instructions configured to cause a computer to perform the processes of the various aspect methods.

BRIEF DESCRIPTION OF THE DRAWINGS

The accompanying drawings, which are incorporated herein and constitute part of this specification, illustrate exemplary aspects of the invention. Together with the general description given above and the detailed description given below, the drawings serve to explain features of the invention.

DETAILED DESCRIPTION

Figure 1A:
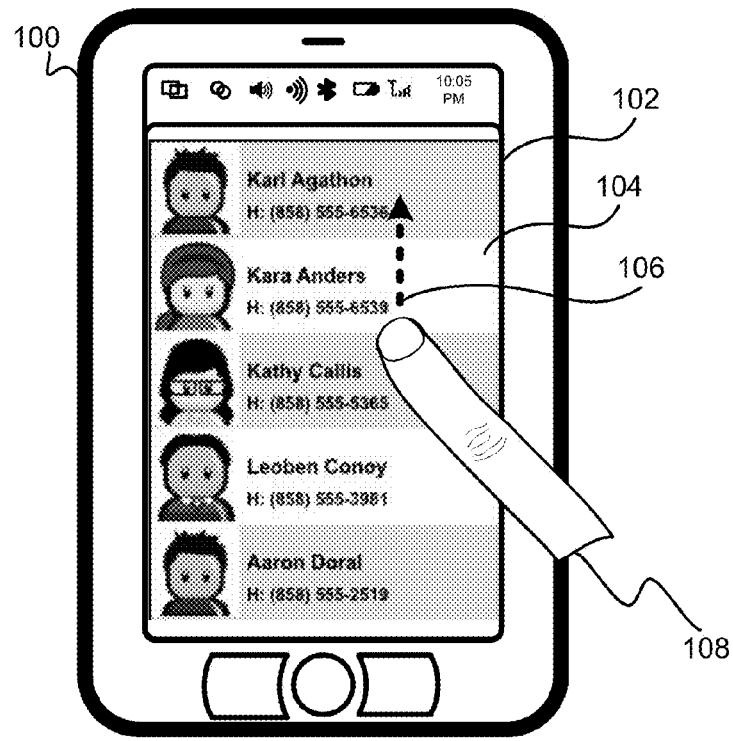
FIG. 1A is a frontal view of a portable computing device showing a list document on a touchscreen display.

The various aspects will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "personal electronic device," "computing device" and "portable computing device" refer to any one or all of cellular telephones, personal data assistants (PDAs), palm-top computers, notebook computers, personal computers, wireless electronic mail receivers and cellular telephone receivers (e.g., the Blackberry® and Treo® devices), multimedia Internet enabled cellular telephones (e.g., the Blackberry Storm®), and similar electronic devices that include a programmable processor, memory, and a connected or integral touch surface or other pointing device (e.g., a computer mouse). In an example aspect used to illustrate various aspects of the present invention, the computing device is a cellular telephone including an integral touchscreen display. However, this aspect is present merely as one example implementation of the various aspects, and as such is not intended to exclude other possible implementations of the subject matter recited in the claims.

As used herein, a "touchscreen" is a touch sensing input device or a touch sensitive input device with an associated image display. As used herein, a "touchpad" is a touch sensing input device without an associated image display. A touchpad, for example, can be implemented on any surface of a computing device outside the image display area. Touchscreens and touchpads are generically referred to herein as a "touch surface." Touch surfaces may be integral parts of a computing device, such as a touchscreen display, or a separate module, such as a touchpad, which can be coupled to the computing device by a wired or wireless data link. The terms touchscreen, touchpad and touch surface may be used interchangeably hereinafter.

As used herein, a "touch event" refers to a detected user input on a touch surface that may include information regarding location or relative location of the touch. For example, on a touchscreen or touchpad user interface device, a touch event refers to the detection of a user touching the device and may include information regarding the location on the device being touched.

As used herein, "document" or "digital document" refers to any of a variety of digital content in which at least a portion can be displayed as a document image on a display of a computing device. Examples of digital documents encompassed in the term "document" include, but are not limited to, digital photograph files (e.g., .tif, .JPG), document files (e.g., .pdf, .txt, etc.), word processing files (e.g., .doc, .rtf, etc.), graphics and drawing files (e.g., .vsd) spread sheet files (e.g., .xls), database files (e.g., .xml, .sql, etc.), contacts databases (e.g., address book application files maintained on cellular telephones), file listings, music library listings, and similar digital lists. Thus, the reference to "document" is not intended to limit claim scope to a written document, but encompass all forms of digital information that can be displayed consistent with the various aspects.

As used herein, "document image" refers to the image that a computing device may generate based on the document contents for presentation on the display of the computing device. Examples of document images include, but are not limited to, digital photographs, displayed portions of a text or word processing document (i.e., excluding metadata and formatting data), displayed graphics and widgets presenting information contained in a database or list file, extended menu lists (e.g., a music listing), and the display generated from spread sheet files.

As used herein, "document boundary" refers to any end, edge or boundary within the document beyond which a document image cannot extend. Examples of document boundaries include, but are not limited to, the beginning of a list, database, or text document, the end of a list, database, or text document, each edge of a digital photograph, and the first and last entry in a database record.

Since an image of the entire contents of a document, such as a word processing document, picture image or a list of contacts, may not entirely fit in a touchscreen display of a computing device, most graphical user interfaces provide scrolling and panning functionality to enable the document image to be moved within the device view window. To allow users to move document images within a touchscreen display, a computing device may be configured to detect the tracing of touch gestures on the display and to move the document image with respect to the view window in response to the direction of the touch gestures. Typical document control gestures enabled on touchscreen computing devices include drag, pan, scroll, and "flick" gestures. In drag, pan, and scroll gestures, the user touches the touchscreen and moves the touching finger in the desired direction of movement without raising the finger. For example, to view the entire content of a contact list, the content of which does not fit in a computing device touchscreen display frame, a user may trace a scroll gesture on the touchscreen to scroll down the list of contacts. The scrolling function allows a user to bring into the computing device display frame different parts of the content list and display it one portion at a time. In a flick gesture, the user touches a touch surface (e.g., a touchscreen), rapidly moves a finger up/down or left/right on the touchscreen and removes the finger in the same motion as if to flick the content in a particular direction. It should be appreciated that a flick gesture (or a user input equivalent to a flick gesture) may also be accomplished on other types of user input devices, such as by rapidly spinning a scroll wheel on a computer mouse or a rapid spin of a trackball. Thus, the reference to a flick gesture is not necessarily limited to a flick gesture executed on a touch surface (e.g., a touchscreen).

Unlike standard personal computers, which trace the movement and boundaries of a document image by showing a display indicator such as a scrollbar on the computer display, many portable computing device displays do not include such display indicators. The absence of display indicators in portable computing device viewers frees valuable display "real estate" on which more of a display image may be shown. However, a portable computing device user who is trying to navigate through a large document (e.g., a long contact list) will often be unaware of the boundaries of the document (e.g., the top or the end of a list). For example, when scrolling down a list of emails by tracing a series of scroll gestures on the touchscreen display, a user may not be able to discern where the list begins or ends. When a user reaches the end of the email list not knowing that an end boundary is reached, the user may continue to trace scroll gestures in an attempt to continue scrolling through the list. When the list fails to respond to the scroll gestures because the end of the list has been reached, the user may wonder whether the computing device has frozen. The only way to confirm that the computing device is operating properly is to scroll in the other direction, which is an unnecessary motion. Such ambiguous operation at the end of a list or boundary of document may cause user frustration and confusion.

The various aspect methods provide a user interface image distortion functionality which provides a visual cue or signal to inform computing device users when drag, pan, scroll, and flick gestures would move a document beyond the document's boundaries. This visual cue includes an intuitive distortion of the image as though the user's gesture were distorting a physical document. The computing device may be configured to detect when a document boundary is reached and a user gesture attempts to move the document beyond the boundary, and to distort the display image consistent with the user gesture. For example, when a user reaches the end of an email list while tracing a scroll gesture on a touchscreen display, the computing device may distort the displayed image of the last email items as if the list were a plastic sheet or an accordion stack of linked items. Thus, the various aspect methods provide an intuitive signal to users when their drag, pan, scroll, and flick gestures have reached a document boundary without having to display scroll bar indicators which occupy valuable display "real estate."

While the various aspects are described with reference examples implemented on computing devices equipped with touchscreen displays, the aspects and the claims are not limited to such implementations. The various aspects may be implemented in any computing device displaying document images that extend beyond the edges of the display window and receive user inputs from user input devices (e.g., a touch surface, computer mouse, track ball, etc.) for moving the document image with respect to the display window. The various aspects provide intuitive visual cues sufficient to obviate the need for scroll bar indicators, thereby increasing the display real estate available for displaying the document image. For example, a document image movement gesture, such as a drag, pan, scroll or flick may also be accomplished using a conventional computer mouse or track ball as is well known. Thus, the examples of executing drag, pan, scroll and flick gestures on a touchscreen user interface device refer to a particularly advantageous implementation of the aspects and are not intended to limit the scope of the claims to touchscreen user interface devices.

In the various aspects, the image distortion functionality may be enabled as part of the graphical user interface (GUI) functionality or as part of an application (e.g., a contact list or photo viewer application). Automatic activation of the image distortion functionality within the GUI may be provided as part of an application. Also, the image distortion functionality may be provided as a default function within a GUI or application.

In some aspects, the image distortion functionality may be manually enabled. A user may select and enable/activate the image distortion functionality manually by pressing a button or by activating an icon on a GUI display. For example, activation of the functionality may be assigned to a soft key, which the user may activate (e.g., by pressing or clicking) to launch the image distortion functionality. As another example, the image distortion functionality may be activated by a user command. For example, the user may use a voice command such as "activate list end signal" to enable the image distortion functionality. Once activated, the image distortion functionality may be used in the manner described herein.

The image distortion functionality may respond to any form of user touch gesture implemented on the computing device touch surface. Since touchscreens are generally superimposed on a display image, in a particularly useful implementation the touch surface is a touchscreen display, thus enabling users to interact with the display image with the touch of a finger. In such applications, the user interacts with an image by touching the touchscreen display with a finger and tracing back and forth or up and down paths.

The various aspects may distort a display image using different types of distortion, such as by shrinking, stretching or bouncing the image. For example, the computing device may distort the display image by uniformly stretching the content (referred to as a "flat stretch"), by logarithmically stretching portion of the content (i.e., referred to as a "partial stretch"), by stretching a portion of the image along one direction while shrinking a portion of the image along the perpendicular dimension (referred to as a "local stretch"), or by creating empty space between fixed size items (referred to as an "accordion stretch").

Figure 1B:
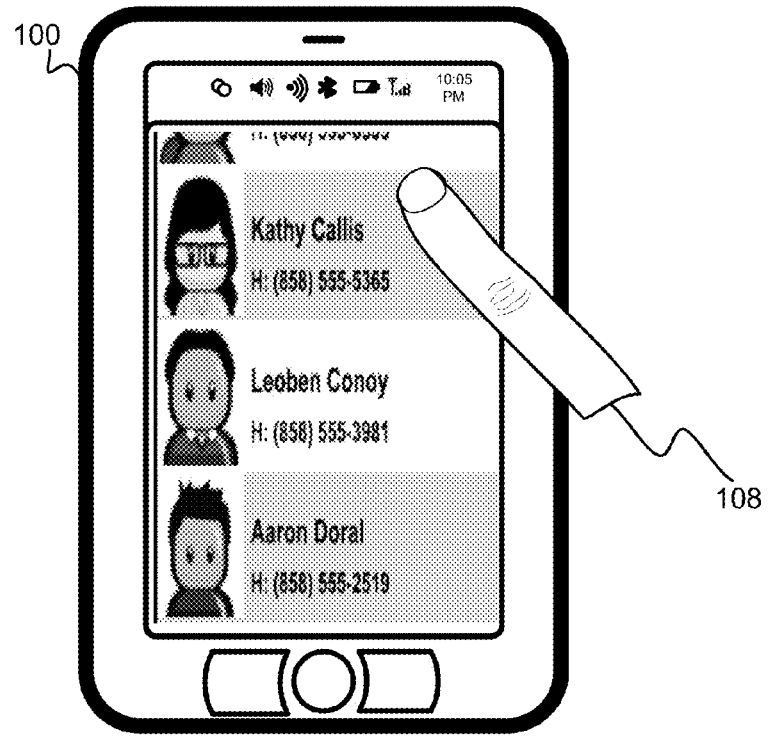
FIG. 1B is a frontal view of a portable computing device illustrating a list end distortion functionality activated by a finger moving in an up direction on a touchscreen display according to an aspect.

FIGS. 1A and 1B illustrate a list end distortion functionality in which a uniform or flat stretch distortion is applied to a list document to inform a user that the end of a contacts list has been reached. As illustrated in FIG. 1A, a user may scroll through a list of contacts by tracing a finger 108 on the touchscreen surface 104 as shown by the dotted arrow 106. The dotted arrow 106 is shown here only to illustrate the direction of the traced gesture. Since the display 102 of the computing device 100 does not include a display indicator to allow the user to determine the boundaries of the contacts list, the user may have no way to know when the end of the list has been reached.

As illustrated in FIG. 1B, the computing device 100 may be configured to inform the user that the end of the list is reached by distorting the display image in response to further scroll (or other) user gestures. In the illustrated example the computing device 100 is configured to apply a uniform distortion to the display that uniformly stretches the display image along the direction of the scroll gesture as though the user is stretching an elastic material on which contact information is printed. Such visual distortion of the contacts list intuitively informs the user that the end of the list is reached and that the computing device is working properly even though the list is not scrolling further.

To apply a uniform or flat stretching distortion, the computing device 100 may scale the display image uniformly. As such, uniform or flat stretching distortion factors may be applied to the display image along the direction of the user touch gestures. As illustrated in FIG. 1B, a user input gesture that attempts to move or scroll the document image beyond the document's end or boundary may stretch the document along the direction of the scroll. Other forms of distortion may also be applied. For example, a user input gesture that attempts to move or scroll beyond a document boundary may cause a stretch along the axis of the user touch gesture and a pinch or shrinkage along the perpendicular direction as might occur to an elastic fabric. In a further aspect, the distortion may be applied in an opposite direction such that if the user input gesture attempts to move the document image in a horizontal direction on the touchscreen display, the image is stretch along its vertical axis (i.e., its height), and if the user attempts to move the document in a vertical direction on the touchscreen display, the image may be stretch along its horizontal axis (i.e., its width). In a further aspect, if the user input gesture attempts to move the document in a diagonal scroll gesture (e.g., towards the corners of the touchscreen display), the image may be stretched along both the horizontal and vertical axes proportional to the angle of the traced touch gesture.

In an aspect, the degree to which a display image is stretched is determined by a distortion factor that is calculated based upon the movement that would be imparted to the document image beyond the encountered boundary by the user's input gesture, such as a touch gesture on a touchscreen. The computing device 100 may be configured to calculate the distortion factor based on the distance that the user input gesture (e.g., touch event) would have the document move once a boundary is reached. For example, in FIG. 1B, the computer device 100 may detect the end of the contacts list and stretch the contact list based on the distance the user's finger 108 moves on the touchscreen 104 once the end of the contact list is reached. The farther the user's finger 108 moves on the touchscreen 104, the greater the distortion factor, and the more the contact list image is distorted. When the user terminates the touch event the stretched display image automatically reverts back to its original form.

The distortion factor may be applied to distort the display image proportionally. For example, when applying a stretch effect to the display image, the computing device 100 may be configured to distort a display image proportional to the distance that the document image movement gesture input would move the document image beyond the document boundary, such as the distance the touch event travels on the touchscreen 104 after the document boundary is reached. Thus, the longer the distance traveled by the touch event, the more severe the distortion of the display image.

In an aspect, the computing device 100 may be configured to limit the extent to which a display image may be distorted. Once the display image reaches its maximum distorted shape, no further distortion may be applied. A stretched display image may also automatically revert back to its original form when the user terminates the touch event.

The automatic reversion of display images back to their original shape may occur in different ways. For example, the automatic reversion may be an animated reversal of the distortion, or an animated under-damping. In an animated reversal the computing device 100 may be configured to animate the reversion of the image back to its original shape, as if undoing the stretching.

The animated under-damping effect reflects the behavior of elastic systems. In nature, when elastic systems are released from tension they often do not stop upon reaching their original shapes, and instead continue bounce back and forth about the original shape before settling into their original states. For example, when an elastic band is stretched and released, the band moves towards its resting state but does not immediately find its original shape. As the band releases potential energy, the band may first shrink and stretch again for certain number of times before it is back to its original form. The computing device 100 may be configured to animate the image distortion transition so as to mimic such natural effects in order to provide the user with a perception of interacting with real world objects.

Figure 2A:
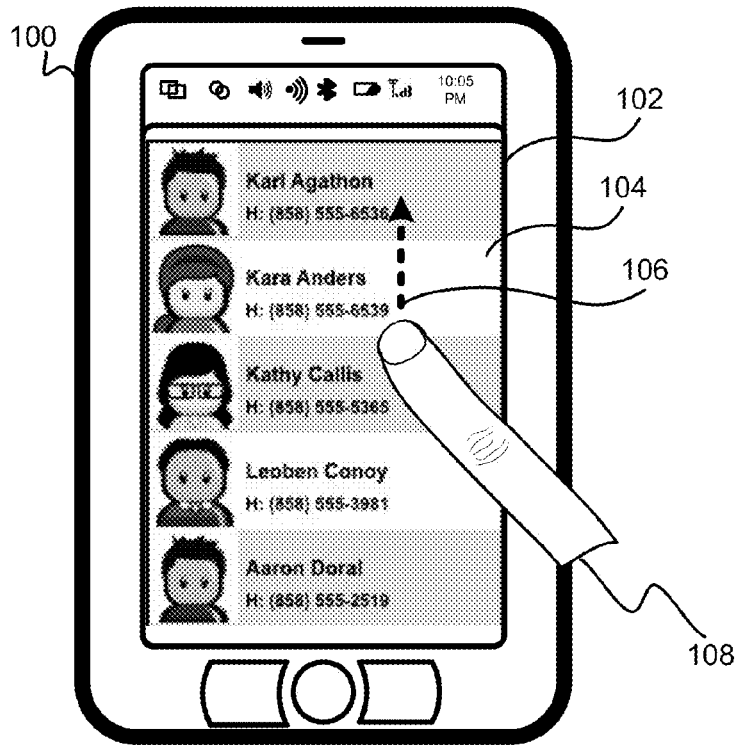
FIGS. 2A and 2B are frontal views of a portable computing device illustrating a distortion functionality activated by a finger moving in an up direction on a touchscreen display according to another aspect.
Figure 2B:
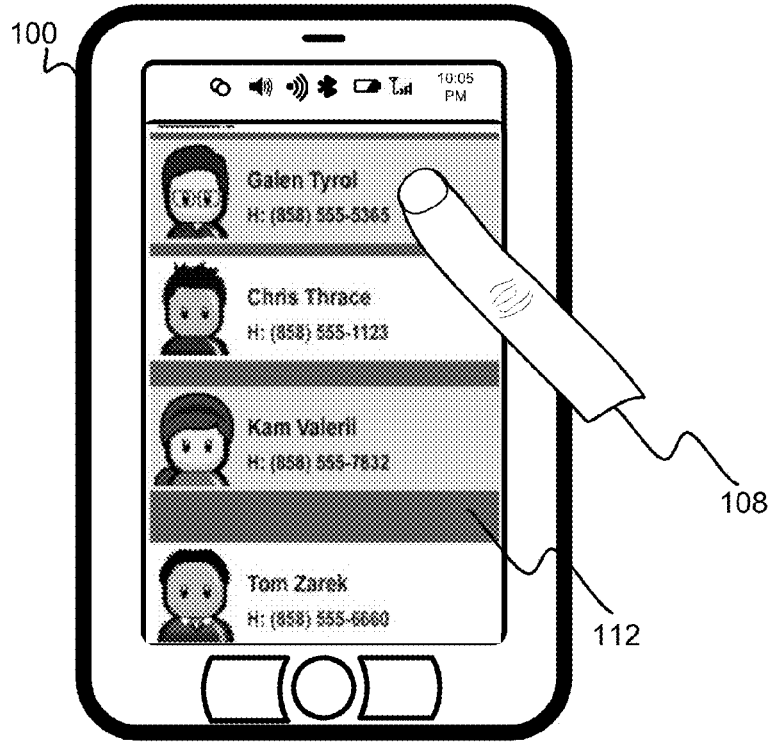

As mentioned above, one type of image distortion that may be applied in various aspects is an accordion stretch which inserts space between image elements without changing the shapes of the elements themselves. This aspect is illustrated in FIGS. 2A and 2B. The accordion stretch distortion creates the appearance of stretching material that lies between the content elements (e.g., graphical widgets) of a document image. The appearance of stretchy "goo," cords, or rubber material between fixed size image elements may provide the appearance of stretching the whole image without distorting the actual contents of the image.

FIG. 2A illustrates a contacts list being browsed by a user tracing scroll gestures with a finger 108. The user may move the contacts list upwards by touching the touchscreen surface 104 of a computing device 100 using a finger 108, and tracing an upward scroll gesture along the dotted arrow 106. Similar to the computing device 100 shown in FIGS. 1A and 1B, the display 102 does not include a scroll bar indicator to inform the user about the boundaries of the contacts list. Therefore, the user may not know when the end of the list is reached.

FIG. 2B the accordion stretch image distortion behavior of the display when the bottom end of the contacts list is reached. FIG. 2B illustrates how the accordion stretch distortion does not change the shape of the contact list display elements (i.e., the contact names, pictures and phone numbers). Instead, the image appears to stretch the goo 112 that lies between the contact data display elements.

Other stretch effects may also be applied in the same manner described above with respect to FIGS. 1A, 1B, 2A, and 2B. In an aspect, a computing device 100 may be configured to apply partial stretching effects to the display image, such that when a boundary of a document image is reached, only certain portions of the display image are stretched while the remainder is unchanged. For example, the portion of the display image that is stretched may be the portion that is between the touch location of the finger 108 and the reached boundary of the document image.

In a further aspect, the display image may appear to be stretched using a local/logarithmic stretch method. In this style of stretching, the display image may appear stretched in a logarithmic fashion to allow the portion being stretched to smoothly transition into the portion of the document image that does not appear stretched.

In a further aspect, the display image may be distorted by locally compressing its content. This distortion style may be applied, for example, when the entire document image fits within the display frame. As a user attempts to move the document image to one direction, the side of the document image in the direction of the movement may appear compressed while the other opposite side of the document image may appear stretched. For example, the entire list of contacts may fit within the display 102 of a computing device 100. If a user attempts to move the contact list downwards by tracing a downward scroll gesture on the touchscreen surface 104, the content of the contact list located below the touch location of the finger 108 may be compressed while the contents above the finger 108 may be stretched.

In a further aspect, when a document boundary is reached during a rapid scroll, such as may occur following a flick gesture, the image may be distorted in a bounce effect to inform a user that a document image boundary has been reached. A rapid scroll typically occurs when a user traces a quick gesture to rapidly move through the contents of a document (e.g., a list) or pan a large image using fewer scroll gestures. Generally, the length of the scroll will depend on the speed and/or distance of the flick gesture. For example, a computing device 100 may be configured to determine the speed of a flick gesture traced on a touchscreen surface 104, and based on the determined speed calculate an endpoint for the scroll or pan, such as a number of list elements that should be scroll or pixels that an image should move with respect to the display view window. A fast scroll gesture may result in the end of a list or the boundary of an image been reached before the calculated endpoint is reached. To inform the user that the flick gesture has reached the end of a list or a boundary of the document, the computing device 100 may be configured to bounce the image within the display to inform the user that the boundary was reached. In a bounce effect, the displayed image may appear to reach a limit in one direction, reversed direction a small amount and then reversed direction again before settling on the end of the document (e.g., displaying the last item in the list or the portion of an image encompassing the encountered a boundary).

In the bounce effect, the computing device 100 may also apply the stretch or shrink effects described above with respect to FIGS. 1A, 1B, 2A, and 2B. For instance, once a boundary of a document image is reached during a rapid scroll and a bounce effect is applied, a stretch effect may also be applied in the direction of the movement of the document image. Thus, if the document image is moving downwards with respect to the display, when the bottom boundary is reached, the document image may compress like a ball striking the floor, rebound a small distance, and revert back to its original shape (i.e., simulating a bounce effect) before coming to a resting state. In other aspects, shrink effects and a combination of stretch and shrink effects may also be used to simulate bouncing effects. The number of rebounds and stretch cycles may be configured by an application developer to achieve a desired user experience.

In a typical computing device, a processor may receive touch event updates from a touchscreen (or other type of touch surface) periodically, such as every few milliseconds. When a user touches the touchscreen, the processor may receive a "touch down" event notification in the next update from the touchscreen, and in each subsequent update from the touchscreen receive a touch location notification until a "touch up" event notification is received. Since the touch location information provided by the touchscreen occurs very frequently, a movement of a user's touch across the surface of the touchscreen will be detected by the processor as a sequence of touch locations which change over time.

Figure 3:
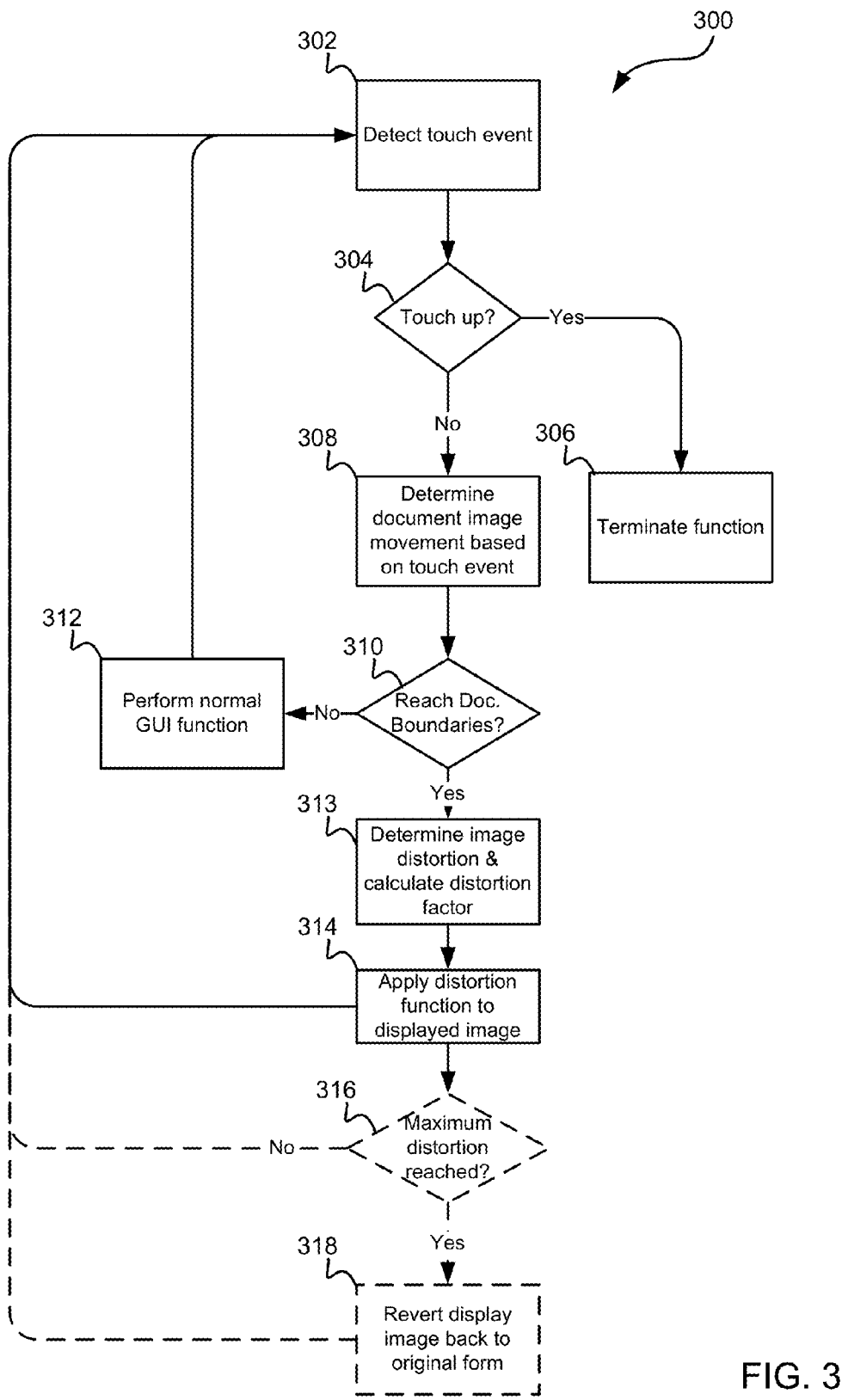
FIG. 3 is a process flow diagram of an aspect method for applying a distortion function to the display image.

FIG. 3 illustrates a process flow of an aspect method 300 for applying a distortion function to a displayed image in response to a scroll event beyond a document boundary. In method 300 at block 302, a computing device 100 may be configured to detect a touch event on a touch surface or user input on another form of user interface device (e.g., a computer mouse or trackball), and determine whether a touch event was a touch up event (or release of a computer mouse button) at determination block 304. If a touch up event is detected (i.e., determination block 304="Yes"), the computing device 100 may terminate the distortion function at block 306. If the touch event was not a touch up event (i.e., determination block 304="No"), the computing device 100 may determine the document image movement that should be caused to happen based on the touch event (or other type of user interface input event) at block 308. This may be accomplished by comparing the current touch location (or other type of user interface input event) received at block 302 to the previous touch location (or other type of user interface input event) which may be stored in memory. If the touch location has changed, this may indicate a drag, scroll, or flick gesture is being implemented to cause a movement in a displayed document (e.g., a scroll of a displayed list). At determination block 310, the computing device 100 may determine whether a boundary of the displayed document image has been reached. If a boundary of the document image and not in reached (i.e., determination block 310="No"), the computing device 100 may perform normal graphical user interface (GUI) function associated with the determine document movement at block 312, and return to block 302 to receive the next touchscreen touch location event (or other type of user interface input event). For example, if a boundary of a document image is not reached and the user is inputting a scroll down function, the computing device 100 may continue to scroll down the document image so long as the user's finger remains in contact with the touchscreen and continues to move.

Once a boundary of the document image is reached (i.e., determination block 310="Yes"), the computing device 100 may determine a distortion that should be applied to the displayed image and, if appropriate, calculate a distortion factor to be used in distorting the image. The particular distortion to be applied to the displayed image may depend upon the application, the nature of the document, user settings and other information. As discussed above, a variety of different distortion functions may be applied to documents according to the various aspects. Thus, an application developer may specify a particular distortion function for particular types of documents. Also, users may be allowed to select a particular distortion function as part of their user settings. Thus, some users may prefer to have greater distortion applied to images so that it is easier to determine when a list and or document boundary has been reached, while some users may prefer to have little or no distortion applied. The amount of distortion to be applied may be determined by a distortion factor that may be calculated based on the distance that the user input gesture (e.g., a touch event) would have the document image move after a boundary of the document is reached, or the distance that an input gesture (e.g., a touch event) would cause a document to move beyond its boundary. Thus, the longer the touch event (or other type of user input), the greater the distortion that will be applied to the image. At block 314, the computing device 100 may apply the determined distortion function to the display image in accordance with the calculated distortion factor. For instance, if the end of a contact list is reached while the user is tracing an upward scroll gesture, the computing device 100 may apply a distortion function, such as a stretching effect, to inform the user that the end of the document image is reached.

The computing device continues to detect touch events (or touch computer mouse button presses, etc.) with each touchscreen update at block 302. Thus, the degree of image distortion applied to the displayed image will continue to depend upon the user input gesture, such as the location of the user's finger on the touchscreen. If the user scrolls backward (i.e., away from the document boundary) without lifting a finger from the touchscreen (or touch surface, computer mouse, etc.), the amount of distortion applied to the displayed image at block 314 will be reduced. If the user lifts a finger off of the touchscreen (or touch surface, computer mouse, etc.), a touch up event will be detected at block 302, which will be determined at determination block 304, prompting an end of the distortion function at block 306. Terminating the distortion function will allow the displayed image to return to normal. In an aspect, terminating the distortion function at block 306 may include animating the release of the distortion.

In an optional aspect, at optional determination block 316, the computing device 100 may be configured to determine when a maximum distortion level of the document image is defined by the calculated distortion factor and the determined distortion function. If the user continues a touch gesture (or other type of user interface input) after the image has been distorted a maximum amount, this may indicate that the user is actually executing a different type of GUI input (i.e., a gesture other than a drag, scroll or flick gesture) for which image distortion is not appropriate. A maximum distortion level depend upon other types of GUI touch gestures (or other type of user interface input) that may be executed and/or may be assigned to each document image to enable the computing device 100 to determine the extent to which the document image may be distorted. For example, an email list may have a maximum distortion level of 3 centimeter, so that once a boundary is reached, the computing device 100 may only distort the displayed email items based on the first 3 centimeter of a linear scroll gesture. If a touch event (or other type of user interface input) would cause more than the designated maximum distortion level, the computing device 100 may be configured to revert the image back to its original form, as may be appropriate for another type of touch gesture. If the maximum distortion of the image is reached (i.e., optional determination block 316="Yes"), the computing device 100 may revert the display image to its original form at optional block 318 before receiving the next touch event at block 302. If a maximum distortion level is not reached (i.e., optional determination block 316="No"), the computing device 100 may continue the current level of distortion and receive the next touch event at block 302.

Figure 4:
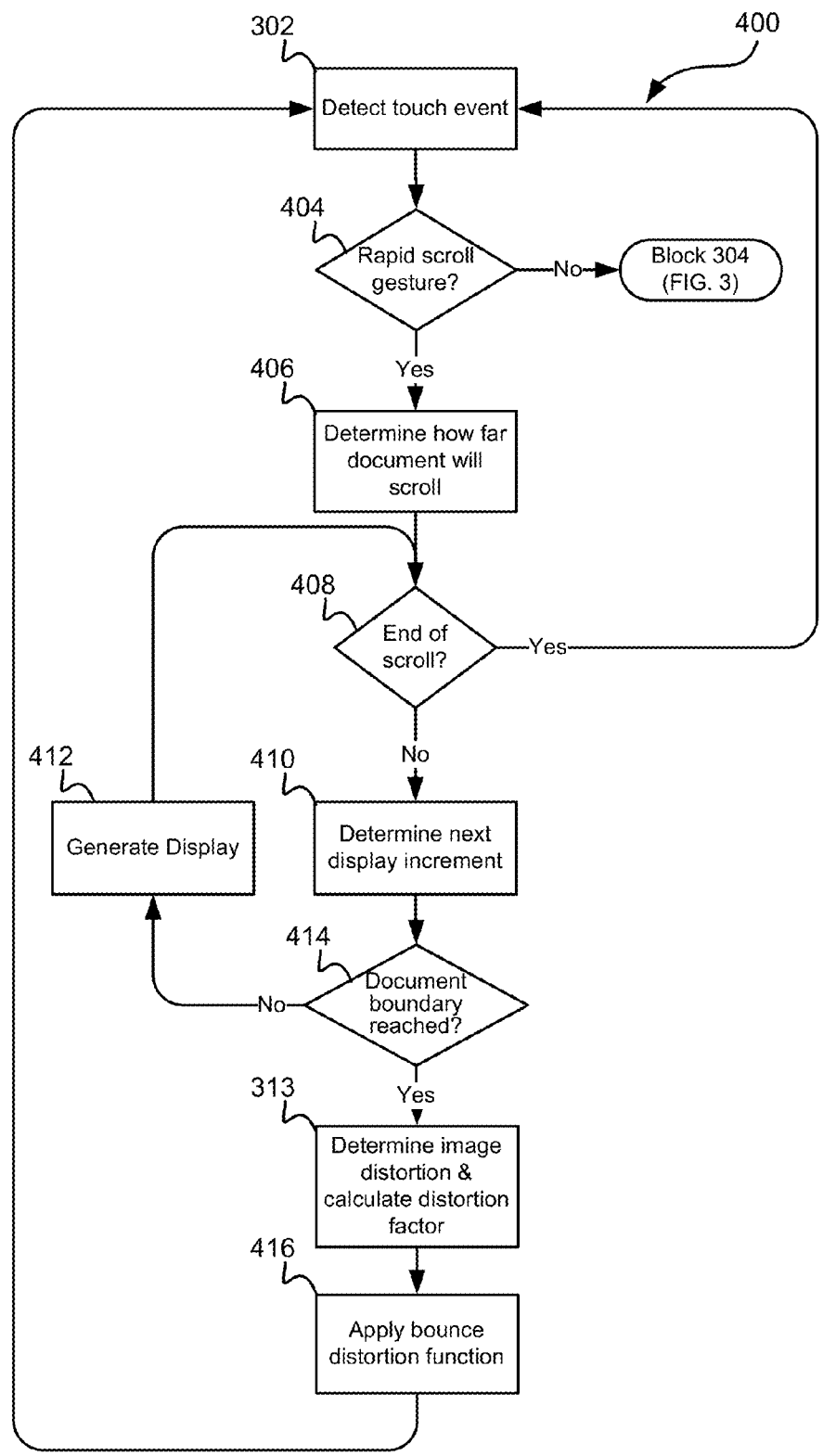
FIG. 4 is a process flow diagram of an aspect method for applying a bounce distortion function to the display image.

FIG. 4 illustrates a process flow of another aspect method 400 for applying a distortion function during a rapid scroll or pan, as may occur in response to a flick gesture. In method 400 at block 302, a computing device 100 may detect a touch event and determine whether the traced gesture is a flick gesture at determination block 404. If the gesture is not a flick gesture (i.e., determination block 404="No"), the computing device 100 may proceed with the processing of method 300 described above with reference to FIG. 3 by determine whether the touch event (or other type of user interface input) was a touch up event at determination block 304 (FIG. 3). If the gesture is determined to be a flick gesture (i.e., determination block 404="Yes"), the computing device 100 may determine how far the document will scroll or pan at block 406. Methods for calculating the distance of a document movement or list scroll based upon a flick gesture are well known and may be used in method 400.

The computing device may be configured to animate the movement of the document in response to the flick gesture, such as by panning the document beneath the display view window or rapidly scrolling through a list of elements. This animation may be accomplished by sequentially determining the next display increment (e.g., the next item in the list) and generating a display including that increment until the rapid pan or scroll reaches a predicted end point. The determination of the next display increment may take into account deceleration factors so that the display appears fast at first but slows over time until the end of the rapid pan or scroll is reached. However, in a conventional computing device that does not include scroll bars in the display, a user may not be aware of when a list end or document boundary has been reached.

To provide the user with a visual cue that the rapid document movement or scroll has encountered a document end or boundary, the computing device may test the document as it animates the movement. For example, at determination block 408, the computing device 100 may determine whether the end of the rapid pan or scroll has been reached (i.e., that the document has come to the end of the travel indicated by the flick gesture). If the end of the pan or scroll has been reached (i.e., determination block 408="Yes"), the computing device 100 may continue normal processing by detect the next touch event at block 302. If the end of the pan or scroll has not been reached (i.e., determination block 408="No"), this means that the animation should continue, so at block 410 the computing device 100 may determine the next display increment. As mentioned above, the determination of the next display increment may include determining a speed of the pan or scroll based upon factors such as the speed imparted by the flick gesture and simulated friction which imposes a deceleration effect in the animation. As the next display increment is determined, at determination block 414 the computing device 100 may determine whether a boundary of the document is reached in that display increment. For instance, the computing device 100 may determine whether the next display increment includes the end of an email list. If a boundary of the document has not been reached (i.e., determination block 414="No"), the computing device 100 may generate a display showing the next display increment at block 412, and return to block 408 to again determine whether the end of the rapid pan or scroll has been reached.

If a boundary of the document has been reached in the next display increment (i.e., determination block 414="Yes"), the computing device 100 may calculate a distortion factor to be applied to the display image in a bounce distortion animation at block 313. The distortion factor may be based on the speed of the rapid pan or scroll when the boundary is encountered. Thus, if the boundary is encountered immediately after a rapid flick gesture when the document is animated as moving rapidly, the calculated distortion factor may be greater, and thus the amount of image distortion (e.g., the degree of stretching or amount of bounce) may be more severe, than if the boundary is encountered towards the end of the rapid pan or scroll animation when the document appears to be moving slowly. As mentioned above, the bounce distortion animation may include one or more bounces and one or more cycles of image stretching or compression. At block 416, the computing device 100 may apply a bounce distortion animation to the display image in accordance with the calculated distortion factor. Once the bounce animation has ended, the computing device may return to normal GUI function by receiving the next touch event at block 302.

As would be appreciated by one of skill in the art, the methods 300 and 400 illustrated in FIGS. 3 and 4 represent examples of how the image distortion functions of the various aspects could be implemented in a computing device. Any number of variations of the processes may be implemented without departing from the scope of the claims.

Figure 5:
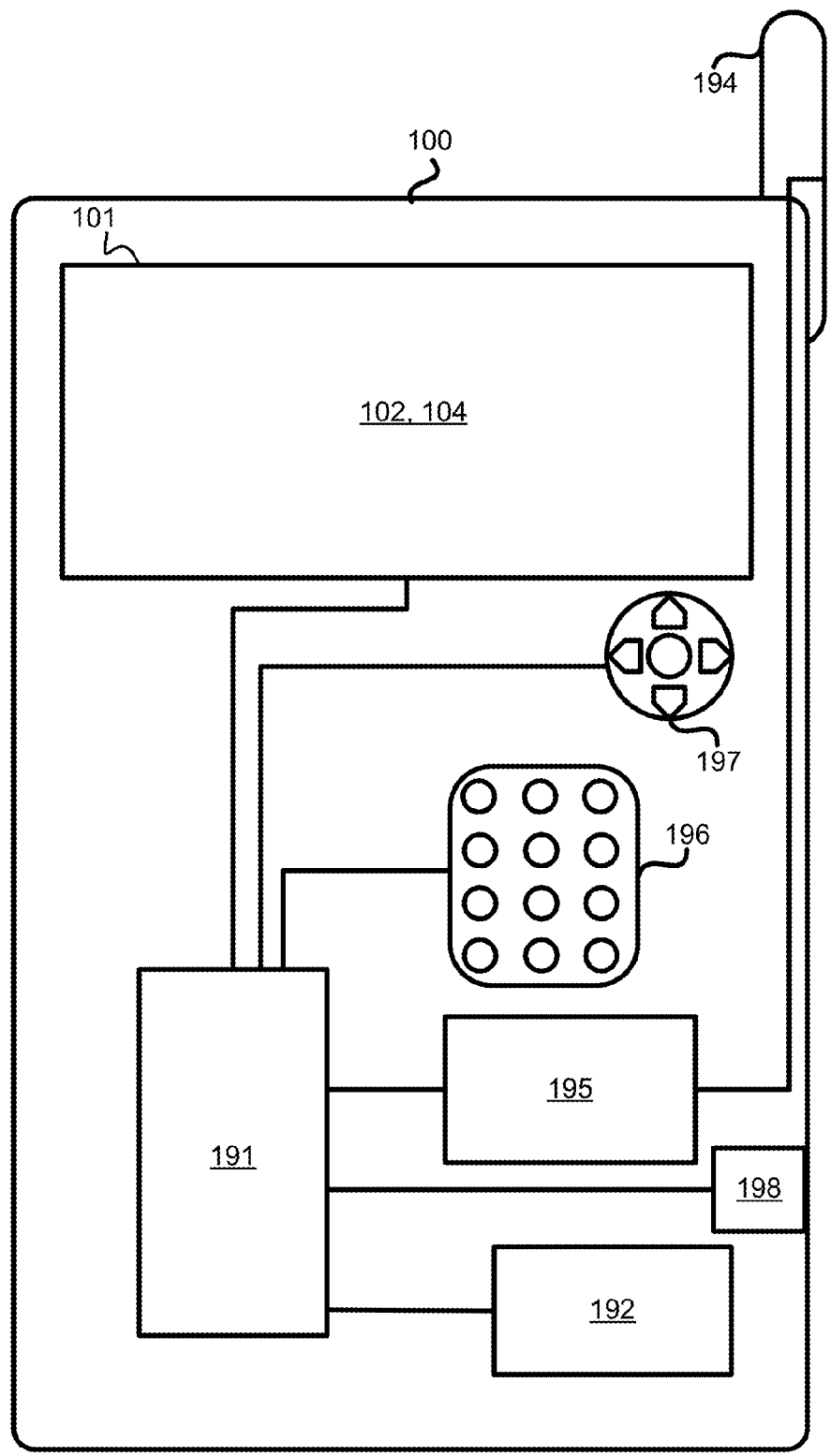
FIG. 5 is a component block diagram of an example mobile computing device suitable for use with the various aspects.

The aspects described above may be implemented on any of a variety of computing devices 100. Typically, such computing devices 100 will have in common the components illustrated in FIG. 5. For example, the computing devices 100 may include a processor 191 coupled to internal memory 192 and a touch surface input device 104 or display 102. The touch surface input device 104 can be any type of touchscreen display 101, such as a resistive-sensing touchscreen, capacitive-sensing touchscreen, infrared sensing touchscreen, acoustic/piezoelectric sensing touchscreen, or the like. The various aspects are not limited to any particular type of touchscreen display 101 or touchpad technology. Additionally, the computing device 100 may have an antenna 194 for sending and receiving electromagnetic radiation that is connected to a wireless data link and/or cellular telephone transceiver 195 coupled to the processor 191. Computing devices 100 which do not include a touchscreen input device 104 (and thus typically do not have a display 102) usually do include a key pad 196 or miniature keyboard, and menu selection keys or rocker switches 197, which serve as pointing devices. The processor 191 may further be connected to a wired network interface 198, such as a universal serial bus (USB) or FireWire® connector socket, for connecting the processor 191 to an external touchpad or touch surface on which the various aspects may also be applied.

In some implementations, a touch surface can be provided in areas of the electronic device 100 outside of the touchscreen display 104 or display 102. For example, the keypad 196 can include a touch surface with buried capacitive touch sensors. In other implementations, the keypad 196 may be eliminated so the touchscreen display 104 provides the complete GUI. In yet further implementations, a touch surface may be an external touchpad that can be connected to the computing device 100 by means of a cable to a cable connector 198, or by a wireless transceiver (e.g., transceiver 195) coupled to the processor 191.

Figure 6:
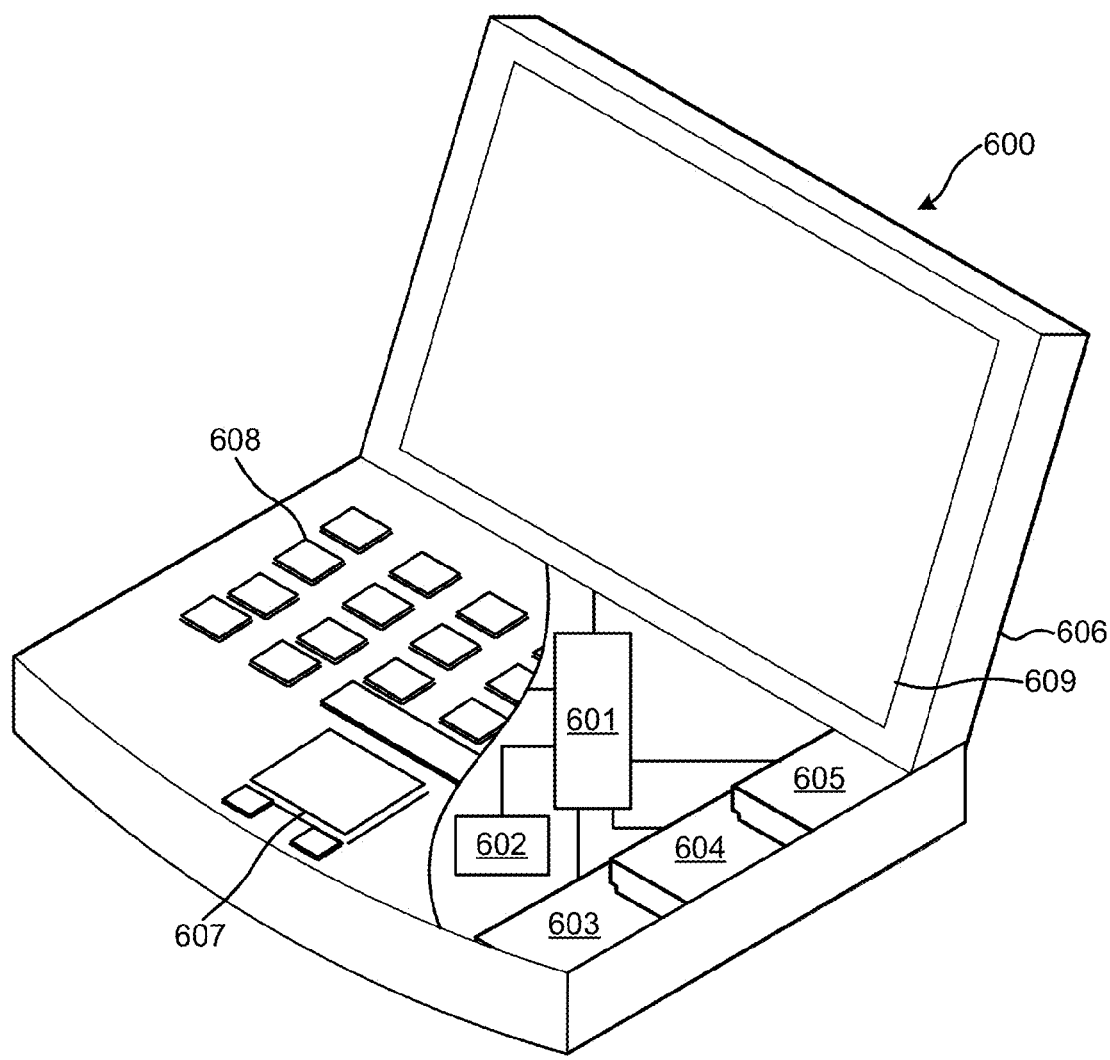
FIG. 6 is a component block diagram of an example portable computing device suitable for use with the various aspects.

The aspects described above may also be implemented within a variety of computing devices, such as a laptop computer 600 as illustrated in FIG. 6. Many laptop computers include a touch pad touch surface that serves as the computer's pointing device, and thus may receive drag, scroll and flick gestures similar to those implemented on mobile devices equipped with a touchscreen display. A laptop computer 600 will typically include a processor 601 coupled to volatile memory 602 and a large capacity nonvolatile memory, such as a disk drive 603. The computer 600 may also include a floppy disc drive 604 and a compact disc (CD) drive 605 coupled to the processor 601. The computer device 600 may also include a number of connector ports coupled to the processor 601 for establishing data connections or receiving external memory devices, such as a USB or FireWire® connector sockets or other network connection circuits 606 for coupling the processor 601 to a network. In a notebook configuration, the computer housing includes the touchpad 607, keyboard 608 and the display 609 all coupled to the processor 601. Other configurations of computing device may include a computer mouse or trackball coupled to the processor (e.g., via a USB input) as are well known.

The computing device processor 191, 601 may be any programmable microprocessor, microcomputer or multiple processor chip or chips that can be configured by software instructions (applications) to perform a variety of functions, including the functions of the various aspects described above. In some portable computing devices 100, multiple processors 191 may be provided, such as one processor dedicated to wireless communication functions and one processor dedicated to running other applications. The processor may also be included as part of a communication chipset.

The foregoing method descriptions and the process flow diagrams are provided merely as illustrative examples and are not intended to require or imply that the processes of the various aspects must be performed in the order presented. As will be appreciated by one of skill in the art the order of blocks and processes in the foregoing aspects may be performed in any order. Words such as "thereafter," "then," "next," etc. are not intended to limit the order of the processes; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm processes described in connection with the aspects disclosed herein may be implemented as electronic hardware, computer software, or combinations of both. To clearly illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some processes or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium. The processes of a method or algorithm disclosed herein may be embodied in a processor-executable software module executed which may reside on a non-transitory computer-readable medium. Non-transitory computer-readable media includes both computer storage media and communication media including any non-transitory medium that facilitates transfer of a computer program from one place to another. A non-transitory storage media may be any available non-transitory media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other non-transitory medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions stored on a non-transitory machine readable medium and/or non-transitory computer-readable medium, which may be incorporated into a computer program product.

The foregoing description of the various aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein, and instead the claims should be accorded the widest scope consistent with the principles and novel features disclosed herein.

What is claimed is:

1. A method for implementing a user interface function on a computing device, comprising:
    detecting an image movement gesture input on a user interface device of the computing device;

determining an image movement of an image displayed on the computing device based on the detected image movement gesture input;

determining whether a boundary of the image displayed on the computing device is reached based on the determined image movement;

determining a distortion function to be applied to distort the image displayed on the computing device;

calculating a distortion factor based on a distance the image movement gesture input would move the image displayed on the computing device after the boundary of the image displayed on the computing device is reached; and distorting the image displayed on the computing device when a boundary of the image is reached by applying the determined distortion function to the image displayed on the computing device based on the calculated distortion factor.

2. The method of claim 1, wherein distorting the image displayed on the computing device comprises one of stretching the image displayed on the computing device, shrinking the image displayed on the computing device, and bouncing the image displayed on the computing device.

3. The method of claim 1, wherein distorting the image displayed on the computing device includes distorting the image displayed on the computing device along an axis selected from a horizontal axis, a vertical axis, a diagonal axis, and both the horizontal and vertical axes.

4. The method of claim 1, wherein distorting the image displayed on the computing device includes distorting the image displayed on the computing device in an accordion style by inserting space between elements of the image displayed on the computing device without distorting the elements of the image displayed on the computing device.

5. The method of claim 1, wherein:
the user interface device is a touch surface; and
the image movement gesture input is a touch event detected on the touch surface.

6. The method of claim 5, wherein the touch surface is a touchscreen display.

7. The method of claim 5, further comprising:
initiating a rapid pan or scroll animation if the touch event represents a flick gesture;
determining whether an end of the rapid pan or scroll animation has been reached; and
animating the distortion of the image displayed on the computing device if the boundary of the image displayed on the computing device is reached before the end of the rapid pan or scroll animation is reached.

8. The method of claim 7, wherein animating the distortion of the image displayed on the computing device comprises animating a bouncing movement of the image displayed on the computing device.

9. The method of claim 7, wherein animating the distortion of the image displayed on the computing device comprises animating a bouncing movement and a compression distortion of the image displayed on the computing device.

10. The method of claim 1, further comprising:
determining whether a maximum level of display image distortion is reached; and
reverting the image displayed on the computing device back to its original form if the maximum level of display image distortion is reached.

11. A computing device, comprising:
a processor;
a display coupled to the processor; and
a user interface device coupled to the processor;

wherein the processor is configured with processor-executable instructions to perform operations comprising:
detecting an image movement gesture input on the user interface device of the computing device;
determining an image movement of an image displayed on the display based on the detected image movement gesture input;
determining whether a boundary of the image displayed on the display is reached based on the determined image movement;
determining a distortion function to be applied to distort the image displayed on the display;
calculating a distortion factor based on a distance the image movement gesture input would move the image displayed on the display after the boundary of the image displayed on the display is reached; and
distorting the image displayed on the display when a boundary of the image is reached by applying the determined distortion function to the image displayed on the display based on the calculated distortion factor.

12. The computing device of claim 11, wherein the processor is configured with processor-executable instructions such that distorting the image displayed on the display comprises one of stretching the image displayed on the display, shrinking the image displayed on the display, and bouncing the image displayed on the display.

13. The computing device of claim 11, wherein the processor is configured with processor-executable instructions such that distorting the image displayed on the display includes distorting the image displayed on the display along an axis selected from a horizontal axis, a vertical axis, a diagonal axis, and both the horizontal and vertical axes.

14. The computing device of claim 11, wherein the processor is configured with processor-executable instructions such that distorting the image displayed on the display includes distorting the image displayed on the display in an accordion style by inserting space between elements of the image displayed on the display without distorting the elements of the image displayed on the display.

15. The computing device of claim 11, wherein the user interface device is a touch surface, and
wherein the processor is configured with processor-executable instructions such that the image movement gesture input is a touch event detected on the touch surface.

16. The computing device of claim 15, wherein the touch surface is a touchscreen display.

17. The computing device of claim 15, wherein the processor is configured with processor-executable instructions further comprising:
initiating a rapid pan or scroll animation if the touch event represents a flick gesture;
determining whether an end of the rapid pan or scroll animation has been reached; and
animating the distortion of the image displayed on the display if the boundary of the image displayed on the display is reached before the end of the rapid pan or scroll animation is reached.

18. The computing device of claim 17, wherein the processor is configured with processor-executable instructions such that animating the distortion of the image displayed on the display comprises animating a bouncing movement of the image displayed on the display.

19. The computing device of claim 17, wherein the processor is configured with processor-executable instructions such that animating the distortion of the image displayed on the display comprises animating a bouncing movement and a compression distortion of the image displayed on the display.

20. The computing device of claim 11, wherein the processor is configured with processor-executable instructions further comprising:
   determining whether a maximum level of display image distortion is reached; and
   reverting the image displayed on the display back to its original form if the maximum level of display image distortion is reached.

21. A computing device, comprising:
   means for detecting an image movement gesture input on a user interface device of the computing device;
   means for determining an image movement of an image displayed on the computing device based on the detected image movement gesture input;
   means for determining whether a boundary of the image displayed on the computing device is reached based on the determined image movement;
   means for determining a distortion function to be applied to distort the image displayed on the computing device;
   means for calculating a distortion factor based on a distance the image movement gesture input would move the image displayed on the computing device after the boundary of the image displayed on the computing device is reached; and
   means for distorting the image displayed on the computing device when a boundary of the image is reached by applying the determined distortion function to the image displayed on the computing device based on the calculated distortion factor.

22. The computing device of claim 21, wherein means for distorting the image displayed on the computing device comprises one of means for stretching the image displayed on the computing device, means for shrinking the image displayed on the computing device, and means for bouncing the image displayed on the computing device.

23. The computing device of claim 21, wherein means for distorting the image displayed on the computing device includes means for distorting the image displayed on the computing device along an axis selected from a horizontal axis, a vertical axis, a diagonal axis, and both the horizontal and vertical axes.

24. The computing device of claim 21, wherein means for distorting the image displayed on the computing device includes means for distorting the image displayed on the computing device in an accordion style by inserting space between elements of the image displayed on the computing device without distorting the elements of the image displayed on the computing device.

25. The computing device of claim 21, wherein:
   the user interface device is a touch surface; and
   the image movement gesture input is a touch event detected on the touch surface.

26. The computing device of claim 25, wherein the touch surface is a touchscreen display.

27. The computing device of claim 25, further comprising:
   means for initiating a rapid pan or scroll animation if the touch event represents a flick gesture;
   means for determining whether an end of the rapid pan or scroll animation has been reached; and
   means for animating the distortion of the image displayed on the computing device if the boundary of the image displayed on the computing device is reached before the end of the rapid pan or scroll animation is reached.

28. The computing device of claim 27, wherein means for animating the distortion of the image displayed on the computing device comprises means for animating a bouncing movement of the image displayed on the computing device.

29. The computing device of claim 27, wherein means for animating the distortion of the image displayed on the computing device comprises means for animating a bouncing movement and a compression distortion of the image displayed on the computing device.

30. The computing device of claim 21, further comprising:
   means for determining whether a maximum level of display image distortion is reached; and
   means for reverting the image displayed on the computing device back to its original form if the maximum level of display image distortion is reached.

31. A non-transitory processor-readable storage medium having stored thereon processor-executable instructions configured to cause a computer device processor to perform operations, comprising:
   detecting an image movement gesture input on a user interface device of a computing device;
   determining an image movement of an image displayed on the computing device based on the detected image movement gesture input;
   determining whether a boundary of the image displayed on the computing device is reached based on the determined image movement;
   determining a distortion function to be applied to distort the image displayed on the computing device;
   calculating a distortion factor based on a distance the image movement gesture input would move the image displayed on the computing device after the boundary of the image displayed on the computing device is reached; and
   distorting the image displayed on the computing device when a boundary of the image is reached by applying the determined distortion function to the image displayed on the computing device based on the calculated distortion factor.

32. The non-transitory processor-readable storage medium of claim 31, wherein the stored processor-executable instructions are configured to cause a computer device processor to perform operations such that distorting the image displayed on the computing device comprises one of stretching the image displayed on the computing device, shrinking the image displayed on the computing device, and bouncing the image displayed on the computing device.

33. The non-transitory processor-readable storage medium of claim 31, wherein the stored processor-executable instructions are configured to cause a computer device processor to perform operations such that distorting the image displayed on the computing device includes distorting the image displayed on the computing device along an axis selected from a horizontal axis, a vertical axis, a diagonal axis, and both the horizontal and vertical axes.

34. The non-transitory processor-readable storage medium of claim 31, wherein the stored processor-executable instructions are configured to cause a computer device processor to perform operations such that distorting the image displayed on the computing device includes distorting the image displayed on the computing device in an accordion style by inserting space between elements of the image displayed on the computing device without distorting the elements the image displayed on the computing device.

35. The non-transitory processor-readable storage medium of claim 31, wherein the stored processor-executable instructions are configured to cause a computer device processor to perform operations such that:
   the user interface device is a touch surface; and the image movement gesture input is a touch event detected on the touch surface.

36. The non-transitory processor-readable storage medium of claim 35, wherein the stored processor-executable instructions are configured to cause a computer device processor to perform operations such that the touch surface is a touchscreen display.

37. The non-transitory processor-readable storage medium of claim 35, wherein the stored processor-executable instructions are configured to cause a computer device processor to perform operations further comprising:
    initiating a rapid pan or scroll animation if the touch event represents a flick gesture;
    determining whether an end of the rapid pan or scroll animation has been reached; and
    animating the distortion of the image displayed on the computing device if the boundary of the image displayed on the computing device is reached before the end of the rapid pan or scroll animation is reached.

38. The non-transitory processor-readable storage medium of claim 37, wherein the stored processor-executable instructions are configured to cause a computer device processor to perform operations such that animating the distortion of the image displayed on the computing device comprises animating a bouncing movement of the image displayed on the computing device.

39. The non-transitory processor-readable storage medium of claim 37, wherein the stored processor-executable instructions are configured to cause a computer device processor to perform operations such that animating the distortion of the image displayed on the computing device comprises animating a bouncing movement and a compression distortion of the image displayed on the computing device.

40. The non-transitory processor-readable storage medium of claim 31, wherein the stored processor-executable instructions are configured to cause a computer device processor to perform operations further comprising:
    determining whether a maximum level of display image distortion is reached; and
    reverting the image displayed on the computing device back to its original form if the maximum level of display image distortion is reached.

41. A method for implementing a user interface function on a computing device, comprising:
    detecting an image movement gesture input on a user interface device of the computing device;
    determining an image movement of an image displayed on the computing device based on the detected image movement gesture input;
    determining whether a boundary of the image displayed on the computing device is reached based on the determined image movement; and
    distorting the image displayed on the computing device when a boundary of the image is reached, wherein distorting the image displayed on the computing device includes distorting the image displayed on the computing device in an accordion style by inserting space between elements of the image displayed on the computing device without distorting the elements of the image displayed on the computing device.

42. A computing device, comprising:
    a processor;
    a display coupled to the processor; and
    a user interface device coupled to the processor,
    wherein the processor is configured with processor-executable instructions to perform operations comprising:
        detecting an image movement gesture input on the user interface device of the computing device;
        determining an image movement of an image displayed on the display based on the detected image movement gesture input;
        determining whether a boundary of the image displayed on the display is reached based on the determined image movement; and
        distorting the image displayed on the display when a boundary of the image is reached such that distorting the image displayed on the display includes distorting the image displayed on the display in an accordion style by inserting space between elements of the image displayed on the display without distorting the elements of the image displayed on the display.

43. A computing device, comprising:
    means for detecting an image movement gesture input on a user interface device of the computing device;
    means for determining an image movement of an image displayed on the computing device based on the detected image movement gesture input;
    means for determining whether a boundary of the image displayed on the computing device is reached based on the determined image movement; and
    means for distorting the image displayed on the computing device when a boundary of the image is reached by distorting the image displayed on the computing device in an accordion style by inserting space between elements of the image displayed on the computing device without distorting the elements of the image displayed on the computing device.

44. A non-transitory processor-readable storage medium having stored thereon processor-executable instructions configured to cause a computing device processor to perform operations, comprising:
    detecting an image movement gesture input on a user interface device of the computing device;
    determining an image movement of an image displayed on the computing device based on the detected image movement gesture input;
    determining whether a boundary of the image displayed on the computing device is reached based on the determined image movement; and
    distorting the image displayed on the computing device when a boundary of the image is reached such that distorting the image displayed on the computing device includes distorting the image displayed on the computing device in an accordion style by inserting space between elements of the image displayed on the computing device without distorting the elements of the image displayed on the computing device.

* * * * *